United States Patent Office 3,334,973
Patented Aug. 8, 1967

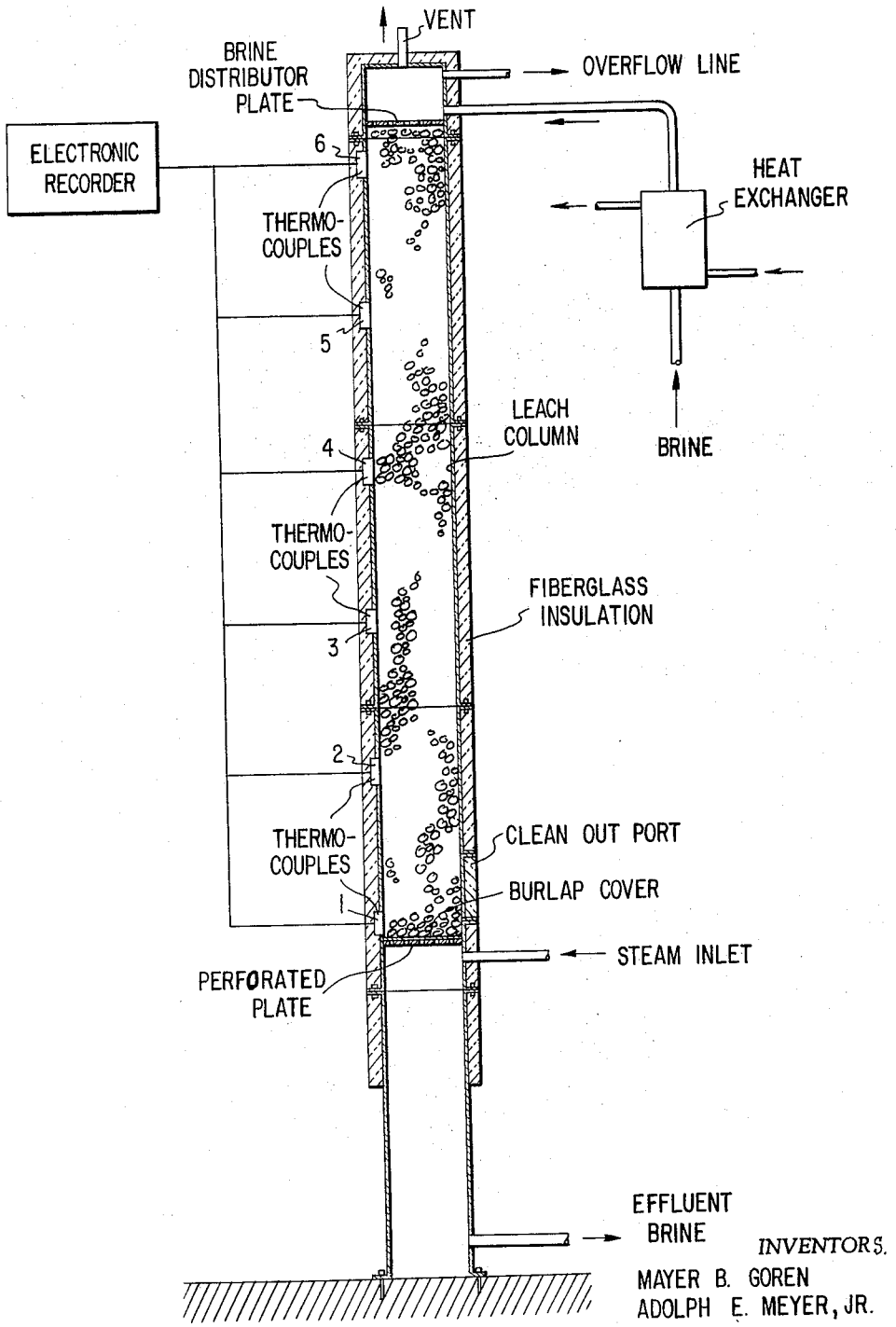

3,334,973
CONTROL OF PERCOLATION LEACHING OF ORES EXHIBITING A SIGNIFICANT HEAT OF SOLUTION
Mayer B. Goren, Golden, and Adolph E. Meyer, Wheatridge, Colo., assignors to Kerr-McGee Corporation, a corporation of Delaware
Filed Feb. 25, 1964, Ser. No. 347,123
16 Claims. (Cl. 23—311)

ABSTRACT OF THE DISCLOSURE

A novel process for percolation leaching a bed of ore having a soluble constituent exhibiting a significant heat of solution in which active leaching at a predetermined depth is detected by taking and comparing a series of temperature readings on the leach liquor at the depth until a sharp change in the temperature is noted, thereby indicating that active leaching is occurring, and the duration of the leach for the production of leach liquor having a desired concentration of a constituent of the ore is determined in response thereto.

---

This invention broadly relates to the percolation leaching of materials which contain substances having significant heats of solution. In one of its more specific variants, the invention relates to improvements in the percolation leaching of potash ores.

A wide variety of ores containing solvent soluble constituents are amenable to processing by percolation leaching wherein the crude or partially refined ore with its undesired mineral and gangue material content is charged to a vat, tank or pit having a false bottom and the resulting body of ore leached in place. As examples of ores that may be processed by percolation leaching, there may be mentioned ores of soluble potassium salts such as potassium chloride, ores of soluble nitrate salts such as sodium nitrate (caliche), ores of borax, etc. Broadly speaking, in practicing such percolation leaching processes a solvent liquid at a chosen temperature is fed to the ore body to dissolve selectively the desired mineral constituent and the bed of ore with its gangue serves as a filtering medium for the liquor which is passing therethrough. Thus, it is often possible to avoid costly and difficult filtration steps in the processing of the ore.

While numerous specific ores are suitable for use in practicing the present invention including the ores mentioned above, in the interest of simplifying the discussion the invention will be described and illustrated hereinafter with specific reference to the processing of potash ores of the type found in the Carlsbad region of New Mexico. However, it will be understood by those skilled in the art that a wide variety of other ores amendable to percolation leaching may be substituted and used.

The theory of brine production in the extraction of potassium chloride from potash ores containing substantial amounts of sodium chloride is well known to those skilled in the art. It may be summarized by stating that if a brine that is saturated with both potassium chloride and soduim chloride at low temperature is subsequently heated and contacted with an excess of these salts until equilibrium is reached, then apparently only potassium chloride will be dissolved. When such a saturated hot brine is later cooled, substantially pure potassium chloride crystallizes out and the sodium chloride remains in solution in the low temperature brine. The resultant low temperature brine then may be heated and recycled in the process to dissolve additional quantities of potassium chloride which likewise may be crystallized out upon cooling. This process therefore enabels one to separate the sodium chloride and potassium chloride contents of potash ore. In practicing the process, an ideal low temperature (25° C.) brine will contain by weight approximately 11% potassium chloride, 20.5% sodium chloride and the remainder water; while a high temperature brine in equilibrium at 90° C. will contain by weight approximately 20.5% potassium chloride, 17% sodium chloride and the remainder water.

It has long been desired to achieve practical percolation leaching of Carlsbad potash ores since these deposits, particularly those of lower grade with respect to potassium chloride content, are usually heavily contaminated with troublesome clays and other insoluble constituents such as hematite. Upon contacting the ore with leach brines or solutions, the insolubles will in ordinary agitation leaching slake, peptize and disperse as fine slimes which interfere markedly with subsequent clarification operations such as thickening or filtering. Accordingly, effective practical percolation leaching of Carlsbad type potash ore with elimination or significant alleviation of the clarification difficulties is highly desirable. Numerous attempts have been made to devise practical schemes for the percolation leaching of such ores but they have not been entirely satisfactory in the commercial production of potash. In the commercial leaching of Carlsbad type potash ores, it is apparent that in order for the commercial process to be attractive the brine emerging from the ore body at the higher temperature must be substantially saturated with potassium chloride so that it will release, upon cooling, as much substantially pure crystallized potassium chloride as possible. In instances where unsaturated brine is produced in a substantial amount, the potassium chloride yield may be reduced in quantity and also quality due to sodium chloride contamination and, in aggravated instances, it may even prevent any yield of potassium chloride from precipitating out of the brine. There is also a substantial heat loss due to inefficient use of the high temperature brine. It is therefore apparent that the production of substantially all saturated brine in a commercial process is of utmost importance. However, there has been no simple, practical method for determining heretofore when a column of ore is no longer producing saturated brine and thus should be taken off stream insofar as saturated brine production is concerned. While there have been certain involved systems based upon the specific gravity of the emerging brine, these systems have not proved to be entirely satisfactory.

It is an object of the present invention to provide an improved process for the percolation leaching of ores.

It is still a further object of the present invention to provide an improved process for determining the course of leaching of a body of ore amenable to percolation leaching.

It is still a further object to provide a process wherein a solvent liquid substantially saturated with respect to a soluble constituent of an ore amenable to percolation leaching may be produced continuously without the need for storing solvent liquid which is only partially saturated with respect to the soluble constituent.

It is still a further object to provide a process wherein brine substantially saturated with respect to potassium chloride is continuously produced from Carlsbad type potash ore without the need for storing brine partially saturated with potassium chloride or recirculating partially saturated brine through the ore.

Still other objects and advantages will be apparent to those skilled in the art upon reference to the following detailed description, the specific examples, and the drawing which graphically illustrates one presently preferred arrangement of apparatus for practicing the invention.

In one process for the production of saturated high temperature brine, brine saturated at low temperature and heated to a higher temperature is passed through crushed potash ore in place in a series of vats for as long as brine issuing from the last vat in the series is substantially saturated with respect to potassium chloride. When the brine issuing from the last vat in the series begins to deviate from saturation and thus is no longer saturated thereto, a vat containing fresh ore is put on stream at the end of the series. This process is continued until the ore in the first vat in the series has been depleted to a desired level in potassium chloride content, at which time the solvent brine is then displaced from the depleted ore, the depleted ore unloaded from the vat, and the vat reloaded with fresh ore to be placed eventually at the end of the series of vats.

In the above process, it is preferred that the following conditions be present:

(1) The solvent liquid such as mother liquor from a crystallizing operation should be sufficiently hot so that potassium chloride can be recovered from a saturated solution by a cooling step;

(2) For best results, the ore should be preheated and preferably by steam; and (3) Preferably, the ore should be coarsely crushed to obtain high flow rates of brine.

The percolation leaching process may be effected in a variety of ways. For instance, a quantity of potash ore may be crushed to the desired size, charged to a heated or insulated column and heated in place to an elevated temperature such as about 90° C. or highger by steaming. The charge then may be leached in place by feeding thereto a sufficient quantity of sodium chloride-potassium chloride brine which is substantially saturated with respect to potassium chloride and unsaturated with respect to sodium chloride at a relatively low temperature such as 25° C., and which is heated to a higher temperature such as 90° C. or higher so as to be unsaturated at the higher temperature with respect to potassium chloride and preferably substantially saturated with respect to sodium chloride. The effluent brine flowing from the body of ore is collected and, when following prior art practices, analyzed at frequent intervals for its potassium chloride content. Under idealized conditions and at extremely long brine retention times, only saturated brine would be produced.

Under the less than ideal conditions such as are always encountered in commercial practice, the actual potassium chloride concentration in the brine deviates from the ideal. When sufficient brine has been fed, the potassium chloride concentration. A relatively small fraction of the brine charge may therefore issue from the leach column saturated with potassium chloride, and the remainder will not be saturated even though additional undissolved potassium chloride is present within the leached ore.

If the effluent brine contains a sufficiently high concentration of potassium chloride, it may be processed in a suitable crystallizing device and cooled to yield a substantially pure crystalline potassium chloride product. On the other hand, the cooling of brine products having concentrations less than substantially saturated, will yield a potassium chloride product of lesser purity as the effluent brine drops in potassium chloride content to the influent concentration. The latter potassium chloride product is inferior and it would require further purification such as by recrystallization or flotation in order to produce a commercially satisfactory product. Alternatively, fractions of the unsaturated brine may be stored separately and used in subsequent leaches.

It is evident from the above that in the percolation leaching of a potash ore, the product brine being processed by crystallization should be substantially saturated with potassium chloride at high temperature. Additionally, economics demand that a high ratio of saturated brine to unsaturated brine be produced in order to minimize storage of advancing brines or reprocessing of low grade potassium chloride produced from cooling of less than saturated brines.

It has been discovered that the course of leaching of a bed of ore or other material which contains substances having significant heats of solution may be followed by observing the temperature in various parts of the bed, and that it is possible to anticipate the termination of the output of saturated brine. For example, thermocouples or other temperature indicating devices located within or slightly ahead of the site in the ore body undergoing active leaching will indicate a substantially different temperature than exists at points in the bed either largely leached or not yet leached. A thermocouple will remain at a substantially constant temperature until active leaching begins to occur immediately above it, and then the temperature changes markedly. In instances where the material to be leached has an exothermic heat of solution, there is a sharp rise in temperature, and when the substances to be leached has an endothermic heat of solution, there is a sharp drop in temperature. As leaching progresses, and especially when leaching is largely completed in the vicinity of the thermocouple, a further abrupt change in temperature ensues. Experience has shown that substantially saturated brine is delivered from an ore body up until shortly before a thermocouple placed at the bottom of the ore bed shows the characteristic further temperature change following the sharp change in temperature at the time active leaching commences.

Potassium chloride has an endothermic heat of solution and thus there is first a drop in the temperature of the leach liquor when active leaching commences followed by a rise when the leaching is largely completed. When leaching a column of potash ore while continuously monitoring the temperature of the leach liquor by means of a thermocouple placed near the bottom of the column, as well as thermocouples spaced higher in the column if desired, it may be noted that readings taken continuously at spaced intervals of time will show a definite pattern. There is a series of substantially constant temperature readings up until a certain point, then a slow drop in temperature followed by a sharp drop in temperature, a leveling off of temperature at or near the lower level and then a gradual rise in temperature followed by a rapid rise in temperature. For instance, a series of temperature readings obtained at spaced intervals of time and with the leaching in progress continuously during the entire period may be as follows: 107° C., 107° C., 107° C., 105° C., 105° C., 80° C., 80° C., 82° C., 85° C., 89° C., and 94° C. At the constant temperature reading of 107° C., substantially no leaching is occurring at the site of the thermocouple or immediately thereabove, and it is not until the temperature dropped to 105° C. that leaching occurs immediately above the thermocouple. When the temperature drops sharply to 80° C., this indicates that very active leaching is occurring at the site of the thermocouple with the attendant production of saturated brine at the site of the thermocouple up until this point in the leaching cycle. Upon a rise in the temperature to 80° C., 85° C. and eventually higher temperatures, saturated brine is no longer being produced at the site of the thermocouple and the effluent brine should not be passed to the crystallizer for the production of crystalline potassium chloride if maximum efficiency is to be achieved. Rather, the effluent brine from the site of the thermocouple should be passed through additional ore to achieve substantially complete saturation. In other words, the column of ore above the site of the thermocouple in question is no longer capable of producing saturated brine at the site of the thermocouple at a time approximating the temperature rise to 82–85° C. from 80° C. or shortly thereafter. Usually, the column does not produce saturated brine over 15 to 30 minutes after the initial temperature rise and this serves as a warning signal which is convenient and reliable. When the thermocouple is at the bottom of the ore bed and it is desired to produce only saturated brine, as a margin of safety it is preferred to assume that the column is no longer producing effluent saturated brine when the temperature curve has dropped to its low level or is well flattened out at the low level, and especially when the temperature begins to show the characteristic rise.

When practicing the present invention, the prior art practices of percolation leaching may be followed with the exception of providing a thermocouple to measure the temperature of the ore or brine and preferably near the bottom of the ore bed, i.e., a point near the exit of the effluent brine and thus remote from the entrance of the influent brine. The thermocouple near the exit of the effluent brine may be substantially at the bottom of the ore bed, or a few inches thereabove such as 3, 6, 12, 18 or 20 inches thereabove, as desired. Also, it is preferred to space thermocouples along the ore bed whereby the active site of leaching may be followed as it progresses through the ore bed. It is possible once conditions of operation have been finalized to use only one thermocouple, which may be placed at a point near the exit of the effluent brine so as to accurately follow the course of the leaching at the bottom of the column. If desired, three, four or more thermocouples may be spaced at equal distances along the ore bed so as to follow the course of leaching of the entire ore bed.

Any suitable temperature indicating device may be used in practicing the invention such as thermocouples, thermometers or the like. In most instances, it is desirable to construct a well arranged within the ore body at a known height so as to protect the temperature indicating device and assure its being placed at a known distance from the bottom of the ore bed. The temperature indicating device may be arranged in a manner so as to accurately reflect the true temperature of the leach liquor as it passes the site in question in the ore bed.

While the above discussion is concerned primarily with the leaching of potash ores, it is understood that a wide variety of other materials which contain substances having significant heats of solution may be leached in accordance with the present invention. Preferably, the substance to be solublized should have a heat of solution of at least 0.5 kilo-calories per gram mol, and for best results at least 2–4 kilo-calories per gram mol. In some instances, the substance to be leached has a much higher heat of solution and even better results are obtained as the change in temperature of the leaching medium is more pronounced. The heats of solution may be exothermic or endothermic, and need only differ significantly from zero. Examples of substances having exothermic heats of solution appear in the following table. The heats of solution are given in kilo-calories per gram mol of compound (kg–cal.).

HEAT OF SOLUTION

| Compound | Dilution in Moles of $H_2O$ | Heat of Solution (kg.-cal.) | Temperature, °C. |
|---|---|---|---|
| $BaCl_2$ | 400 | +2.07 | 18 |
| $BaCl_2 \cdot 2H_2O$ | 400 | −4.93 | 18 |
| $CaBr_2$ | 400 | +24.51 | 18 |
| $CaBr_2 \cdot 6H_2O$ | 400 | −1.09 | 18 |
| $CaCl_2$ | 300 | +17.41 | 18 |
| $CaCl_2 \cdot 6H_2O$ | 400 | −4.31 | 19.3 |
| $Ca(NO_3)_2$ | 400 | +3.95 | 18 |
| $Ca(NO_3)_2 \cdot 4H_2O$ | 400 | −7.25 | 18 |
| $CaSO_4$ | | +4.44 | 18 |
| $CaSO_4 \cdot 2H_2O$ | | −0.30 | 18 |
| $MgBr_2$ | | +43.3 | 15 |
| $MgCl_2$ | 800 | +35.92 | 18 |
| $MgCl_2 \cdot 6H_2O$ | 400 | +2.95 | 18 |
| $MgI_2$ | | +49.8 | 15 |
| $Mg(NO_3)_2 \cdot 6H_2O$ | 400 | −4.22 | 18 |
| $MgSO_4$ | 400 | +20.28 | 18 |
| $KHSO_4$ | 200 | −3.80 | 18 |
| $KBr$ | 200 | −5.08 | 18 |
| $K_2CO_3$ | 400 | +6.49 | 18 |
| $K_2CO_3 \cdot 1\frac{1}{2}H_2O$ | 400 | −0.38 | 18 |
| $KCl$ | 100 | −4.19 | 21 |
| $KCl \cdot MgCl_2$ | | +28.2 | |
| $KF$ | | +3.6 | 20 |
| $KF \cdot 2H_2O$ | | −1.0 | 20 |
| $KOH$ | 250 | +13.29 | 18 |
| $KOH \cdot 2H_2O$ | 170 | −0.03 | 15 |
| $KI$ | 200 | −5.11 | 18 |
| $KNO_3$ | 200 | −8.52 | 18 |
| $KH_2PO_4$ | | −4.85 | 15 |
| $K_2SO_4$ | 400 | −6.38 | 18 |
| $K_2SO_4 \cdot MgSO_4$ | | +10.5 | |
| $NaHCO_3$ | | 4.3 | 15 |
| $NaHSO_4$ | 200 | +1.19 | 18 |
| $Na_2B_4O_7$ | | +10.2 | 15 |
| $Na_2B_4O_7 \cdot 10H_2O$ | 1,600 | −25.86 | 18 |
| $NaBr$ | 200 | −0.19 | 18 |
| $NaBr \cdot 2H_2O$ | 300 | −4.71 | 18 |
| $Na_2CO_3$ | 400 | +5.64 | 18 |
| $Na_2CO_3 \cdot H_2O$ | | +2.25 | |
| $NaCl$ | 100 | −1.18 | 18 |
| $NaF$ | 400 | −0.6 | 12 |
| $NaOH$ | 200 | +9.94 | 18 |
| $NaI$ | 200 | +1.22 | 18 |
| $NaI \cdot 2H_2O$ | 300 | −4.01 | 18 |
| $NaNO_3$ | 200 | −5.03 | 18 |
| $Na_2HPO_4$ | 400 | +5.64 | 18 |
| $Na_2HPO_4 \cdot 2H_2O$ | 400 | −0.39 | 18 |
| $Na_2HPO_4 \cdot 7H_2O$ | | −11.3 | 15 |
| $Na_2SO_4$ | 400 | +0.46 | 18 |
| $Na_2SO_4 \cdot H_2O$ | 400 | −1.90 | 18 |
| $Na_2SO_4 \cdot 10H_2O$ | 400 | −18.76 | 18 |
| $Na_2SO_4 \cdot MgSO_4$ | | +12.9 | |

It is understood that a natural or synthetic material containing one or more substances to be leached having a significant heat of solution, including such substances appearing in the above table, may be leached in accordance with the invention. Thus, the invention is applicable to a wide variety of materials having substantial exothermic or endothermic heats of solution.

The foregoing detailed description and the following specific examples are for purposes of illustration only and are not intended as being limiting to the spirit or scope of the appended claims.

*Example I*

The specific apparatus and the operation thereof which is described below in Example I is illustrated in the drawing to facilitate an understanding of the invention.

The leach column employed in this example was constructed of ten gage steel and included four six foot high flanged sections and a cover containing a brine distributor and a vented overflow line. The diameter of the column was twenty inches and the over-all height of the four six foot sections and the cover when assembled was twenty-five feet. The bottom six foot section of the column acted as a footing and the ore was contained in the upper three sections. A removable steel plate with one-half inch diameter holes was inserted one foot above the lower end of the second section from the bottom of the assembled column and this plate was covered with burlap and used to support the ore in the column. A clean-out port was provided near the lower end of the second section for removal of tailings and the upper twenty-one feet of the column were insulated with fiberglas. A conduit for supplying low pressure steam (6 p.s.i.g.) to the bottom plate and upward through the ore bed was provided. Also, thermocouples were inserted through the column wall in thermocouple wells provided therein at six evenly spaced intervals and a commercially available recorder was provided to assure a continuous record of temperatures throughout the ore bed for each of the thermocouples during the entire leaching procedure. The bottom thermocouple (#1) rested almost, but not quite, on the bottom plate and thus measured the approximate temperature of the leach liquor as it passed through the bottom plate. The bottom thermocouple was referred to as #1 and the remaining thermocouples higher in the column were numbered consecutively from #1 at the bottom to #6 at the top.

The column is filled with a potash ore from the Carlsbad Region of New Mexico, assaying by weight approximately 20.7% potassium chloride, 5% insolubles such as clays and hematite and the remainder substantially halite. This ore is crushed to pass a 1¼ inch screen, and it has the following screen analysis:

| Tyler mesh: | Cumulative percent retained |
|---|---|
| +0.525 inch | 11.4 |
| +0.371 inch | 22.9 |
| +3 | 32.9 |
| +4 | 41.2 |
| +6 | 49.5 |
| +8 | 57.9 |
| +10 | 65.6 |
| +14 | 72.2 |
| +20 | 79.2 |
| +28 | 84.5 |
| +35 | 92.6 |
| +48 | 95.2 |
| +65 | 97.2 |

The above described column is filled to a depth of 17 feet with the above described potash ore and the top cover bolted on. The column contains about 2930 lbs. of the ore. Then, low pressure steam is inserted through the bottom plate and the ore heated to a temperature of 107–108° C. using superheated steam.

The brine employed to leach the ore is a synthetic low temperature motor liquor saturated with respect to sodium chloride and potassium chloride at 25° C. This brine is fed at a temperature of about 25–26° C. to a heat exchanger where the temperature is adjusted to yield an effluent having a temperature of about 93–94° C. which is then fed to the top of the column. Effluent from the bottom of the column appeared in about 20 minutes and was restricted to a flow rate of approximately 50–55 gal./sq. ft./hr., while maintaining full flood feed at the top of the column.

A summary of thermocouple readings and potassium chloride analysis of the effluent brine taken at varying times appears below:

| Time (Min.) | Bed Temperature (° C.) Thermocouple No.[1] | | | | | | Effluent Assay (Comments) |
|---|---|---|---|---|---|---|---|
| | 1 | 2 | 3 | 4 | 5 | 6 | |
| 0 (begin feed) | 108 | 108 | 107 | 107 | 107 | 107 | |
| 10 | 107 | 107 | 107 | 107 | 107 | 85 | |
| 15 | 107 | 107 | 107 | 107 | 92 | 86 | |
| 18 | 107 | 107 | 107 | 105 | 80 | 88 | |
| 20 | 107 | 107 | 107 | 105 | 79 | 92 | Discharge from column appeared. 21.6% KCl (saturated). |
| 30 | 106 | 106 | 102 | 80 | 86 | 89 | |
| 38 | 97 | 97 | 90 | 85 | 83 | 96 | |
| 60 | 89 | 84 | 89 | 89 | 95 | 96 | 20.6% KCl (sat'd. at 89° C.). |
| 386 | 90 | | | | | | 13.1% (not saturated). |

[1] Thermocouple at the bottom of the charge is #1.

In view of the above data, it is apparent that saturated brine was produced by the column up until the time the temperature of the bottom thermocouple #1 began to rise following the lowest point reached in the leaching cycle. For instance, and with reference to the readings for thermocouple #1, it is apparent that active leaching in the vicinity of thermocouple #1 began at or shortly after time 1412 as the temperature readings were substantially constant until then. At time 1420 eight minutes later, the temperature reading dropped to 97° C. which indicated that very active leaching with the attendant production of saturated brine is taking place slightly above the thermocouple. The temperature continued to drop and at time 1442, the temperature was 89° C. and the effluent brine was still saturated. Thus, up until this time saturated brine was produced continuously from the start of operation as thermocouple #1 is the thermocouple at the bottom plate in the column. Up until that time, the effluent brine may be passed to a crystallizer for recovery of the potassium chloride content. Past time 1442 it would have been advisable to pass the brine to a fresh column of ore for further leaching and saturation.

*Example II*

The procedure of Example I was followed using the potash ore of Example I but having the following screen size distribution:

| Mesh | Cumulative percent retained | Mesh | Cumulative percent retained |
|---|---|---|---|
| ½″ | 0 | 14 | 71.0 |
| ⅜″ | 7.8 | 20 | 78.7 |
| 3 mesh | 14.9 | 28 | 83.9 |
| 4 | 27.2 | 35 | 87.9 |
| 6 | 39.5 | 48 | 91.0 |
| 8 | 49.2 | 65 | 93.3 |
| 10 | 61.2 | 100 | 94.9 |
| | | −100 | (5.1) |

The following data were obtained:

| Time (Min.) | Eff. vol. (gals.) | Bed Temperature (° C.) Thermocouple No.[1] | | | | | | Effluent (percent KCl) |
|---|---|---|---|---|---|---|---|---|
| | | 1 | 2 | 3 | 4 | 5 | 6 | |
| 0 (begin feed) | 20 | 107 | | 94 | 87 | 91 | 93 | 23.8 |
| 19 | 56 | | | | | | | 22.2 |
| 49 | 120 | 100 | | 86 | 92 | 92 | 94 | 21.1 |
| 79 | 170 | 86 | | 88 | 93 | 93 | 94 | 19.3 |
| 109 | 214 | 86 | | 92 | 93 | 93 | 94 | 19.1 |
| 139 | 245 | 87 | | 92 | 94 | 94 | 94 | 19.9 |
| 169 | 300 | 87 | | 92 | 93 | 93 | 94 | 19.2 |
| 199 | 348 | 87 | | 93 | 94 | 94 | 96 | 19.2 |
| 229 | 410 | 91 | | 96 | 96 | 96 | 96 | 17.7 |
| 259 | 440 | 92 | | 96 | 96 | 95 | 94 | 15.9 |
| 289 | 487 | | | | | | | 15.8 |
| 319 | 540 | 96 | | 94 | 93 | 91 | 92 | 14.7 |
| 349 | 588 | 95 | | 92 | 92 | 97 | 97 | 14.8 |
| 379 | 638 | | | | | | | 14.3 |
| 409 | 683 | | | | | | | 14.4 |
| 439 | 719 | | | | | | | 14.2 |
| 469 | 769 | 92 | | 87 | 87 | 86 | 87 | 12.8 |
| 589 | 882 | | | | | | | 7.5 |
| 688 | 915 | | | | | | | 4.8 |
| 838 | 921 | | | | | | | 5.0 |

[1] Bottom thermocouple is #1. No. 2 thermocouple inoperative.

With reference to the data for thermocouple #1 which is arranged immediately above the bottom plate in the ore column, it may be observed that the temperature was 107° C. initially at time 1002 and the effluent contained 23.8% potassium chloride, which is saturated for that temperature. The temperature then dropped to 86° C. by time 1142 and the brine contained 19.3% potassium chloride, which is saturated for the temperature 86° C. The temperature remains the same and begins a slow rise so that by time 1351, the temperature has risen to 91° C. and the effluent brine concentration contains 17.7% potassium chloride, which is below saturation. Accordingly, when the #1 thermocouple temperature begins to rise or shortly after the temperature curve is well flattened out, it is best to assume that saturated brine is no longer being achieved by the column and it is time to divert the stream of effluent brine from the crystallizer to a subsequent ore bed in a series, or to store the brine awaiting replacement of the ore charge and use of the brine as a leach liquor in further processing.

*Example III*

A series of columns as described in Example I is constructed and arranged whereby the brine is passed successively through the columns in series. The columns are filled with ore and leached as described in Example I and the temperatures of the thermocouples of the various columns are monitored continuously.

The bottom thermocouple for each of the columns in the series is carefully monitored, and in each instance when the thermocouple at the bottom of the ore bed for the last column in the series, or the next preceding column in the series shows the characteristic drop in temperature indicating active leaching is taking place at the plate, then another ore body is placed on stream at the end of the series and the first column in the series is taken off stream. At this time, the brine in the first column in the series has approximately the same temperature at each of the thermocouples and this indicates that no substantial leaching of ore is occurring and the first column is depleted of potassium chloride and may be discarded. In this manner, the course of the leaching for each of the columns in the system may be followed progressively and only saturated brine is produced without going to the trouble and expense of analyzing the brine for potassium chloride content. It is only necessary to observe the thermocouple readings.

When operating in the above manner, it is possible to pass the final effluent brine which is saturated in all instances to a crystallizer and produce substantially pure potassium chloride crystals in the maximum possible quantity. This is accomplished without operating difficulties or reduced yields due to unsaturated brine which is characteristic of the prior art processes.

*Example IV*

This example illustrates the leaching of a substance having an exothermic heat of solution.

The procedure of Example I is followed with the exception of substituting a naturally occurring deposit containing crystal carbonate ($Na_2CO_3 \cdot H_2O$) for the potash ore and using an aqueous leaching medium having an initial temperature of about 100° C. Results are obtained somewhat similar to the data recorded in the table for Example I with the exception of there being a rapid increase in the temperature of the aqueous leaching medium when active leaching commences, rather than a decrease as in Example I. Thus, it is possible to use the principles of the present invention in leaching substances having both exothermic and endothermic heats of solution.

What is claimed is:

1. In a process for leaching solid materials amenable to percolation leaching wherein a bed of the material containing a desired solvent soluble constituent is percolation leached with a solvent liquid at elevated temperature to produce an effluent containing the desired soluble constituent, the desired solvent soluble constituent having a significant heat of solution and the bed exhibiting a sharp temperature change in a zone of active leaching, which zone progresses downwardly in the said bed of material during the percolation leaching thereof, the improvement comprising determining when active leaching is occurring at a given depth in the bed of material by measuring the temperature of the solvent liquid at the desired depth over a period of time to obtain a series of temperature readings, the temperature being measured prior to the occurrence of active leaching at the said depth and the temperature measurements being continued until a sharp change in the temperature is noted, the solvent liquid at the said depth in the bed of material undergoing a sharp change in temperature thereby indicating that active leaching is occurring determining the period of time neessary for the leaching to effect a desired degree of solubilization of the soluble constituent in the remainder of the bed below the said depth, and terminating the leaching for the production of liquor having a desired concentration of said solvent soluble constituent in response to the said determined period of time.

2. The process of claim 1 wherein the said material is potassium chloride-containing potash ore and the solvent liquid is brine unsaturated with respect to the desired constituent at the elevated temperature.

3. The process of claim 1 wherein the said material is Carlsbad potash ore and the solvent liquid is brine substantially saturated with potassium chloride at a relatively low temperature and heated to a higher temperature.

4. The process of claim 1 wherein the temperature of the solvent liquid is measured at a plurality of depths whereby the course of active leaching in the bed of material may be followed.

5. The process of claim 4 wherein the said material is potassium chloride-containing potash ore and the solvent liquid is brine unsaturated with respect to the desired constituent at the elevated temperature.

6. The process of claim 4 wherein the said material is Carlsbad potash ore and the solvent liquid is brine substantially saturated with potassium chloride at a relatively low temperature and heated to a higher temperature.

7. The process of claim 1 wherein the effluent solvent liquid is substantially saturated with respect to the desired soluble constituent during at least a first portion of the leach, the effluent solvent liquid is unsaturated with respect to the desired solvent soluble constituent during a second portion of the leach subsequent to the said first portion, and the duration of said first portion of the leach is determined by comparing the said temperature readings at a predetermined depth in the body of material.

8. The process of claim 7 wherein the said material is potassium-chloride containing potash ore and the solvent liquid is brine saturated with respect to the desired constituent at the elevated temperature.

9. The process of claim 7 wherein the said material is Carlsbad potash ore and the solvent liquid is brine substantially saturated with potassium chloride at a relatively low temperature and heated to a higher temperature.

10. In a continuous process for leaching solid material amenable to percolation leaching wherein a plurality of beds of the material containing a desired solvent soluble constituent are arranged in series and percolation leached with a solvent liquid at elevated temperature to produce an effluent which is substantially saturated with respect to the desired soluble constituent, the desired solvent soluble constituent having a significant heat of solution, the solvent liquid being passed continuously through the first bed of material in the series and successively through the remaining beds of material in the series, the first bed of material in the series is taken off stream when depleted to a desired extent in the solvent soluble constituent and a fresh bed of material is placed on stream at the end of the series, the improvement comprising determining when active leaching is occurring at a predetermined depth in at least one bed of material by measuring the temperature of the solvent liquid at the predetermined depth over a period of time to obtain a series of temperature readings, the temperature being measured prior to the occurrence of active leaching at the said predetermined depth and the temperature measurements being continued at least until a sharp change in the temperature is noted, the solvent liquid at the said predetermined depth in the said bed of material undergoing a sharp change in temperature thereby indicating that active leaching is occurring determining the period of time necessary for the leaching to effect a desired degree of solubilization of the solvent soluble constituent in the remainder of the bed of material below the predetermined depth with the continuous production of effluent substantially saturated with respect to the solvent soluble constituent, and terminating the leach in the said bed of material for the production of the substantially saturated effluent in response to the said determined period of time.

11. The process of claim 10 wherein the said material is potassium chloride-containing potash ore and the solvent liquid is brine saturated with respect to the desired constituent at the elevated temperature.

12. The process of claim 10 wherein the said material is Carlsbad potash ore and the solvent liquid is brine substantially saturated with potassium chloride at a relatively low temperature and heated to a higher temperature.

13. The process of claim 10 wherein the temperature of the solvent liquid is measured at a plurality of predetermined depths in at least one bed of material whereby the course of active leaching in the said bed of material may be followed.

14. The process of claim 10 wherein the time at which the fresh bed of material is placed on stream is determined by comparing the said temperature readings for a predetermined depth in at least one bed of the material.

15. The process of claim 14 wherein the said material is potassium chloride-containing potash ore and the solvent liquid is brine saturated with respect to the desired constituent at the elevated temperature.

16. The process of claim 15 wherein the said material is Carlsbad potash ore and the solvent liquid is brine substantially saturated at a relatively low temperature and heated to a higher temperature.

References Cited

UNITED STATES PATENTS

| | | | |
|---|---|---|---|
| 2,058,300 | 10/1936 | Cramer | 23—311 |
| 2,173,842 | 9/1939 | Horner | 23—311 X |
| 2,701,210 | 2/1955 | Fisher | 23—309 X |
| 2,904,518 | 9/1959 | Shea | 210—149 X |
| 3,080,220 | 3/1963 | Lagatski | 23—312 |
| 3,220,552 | 11/1965 | Staats | 210—189 X |
| 3,246,962 | 4/1966 | Miller | 23—311 |

FOREIGN PATENTS 451,227    9/1948    Canada.

NORMAN YUDKOFF, *Primary Examiner.*

E. EMERY, *Assistant Examiner.*